Dec. 23, 1969  S. F. TOBIAS, JR  3,485,064
PATTERN MECHANISM FOR KNITTING MACHINES
Filed Dec. 15, 1967  2 Sheets-Sheet 1
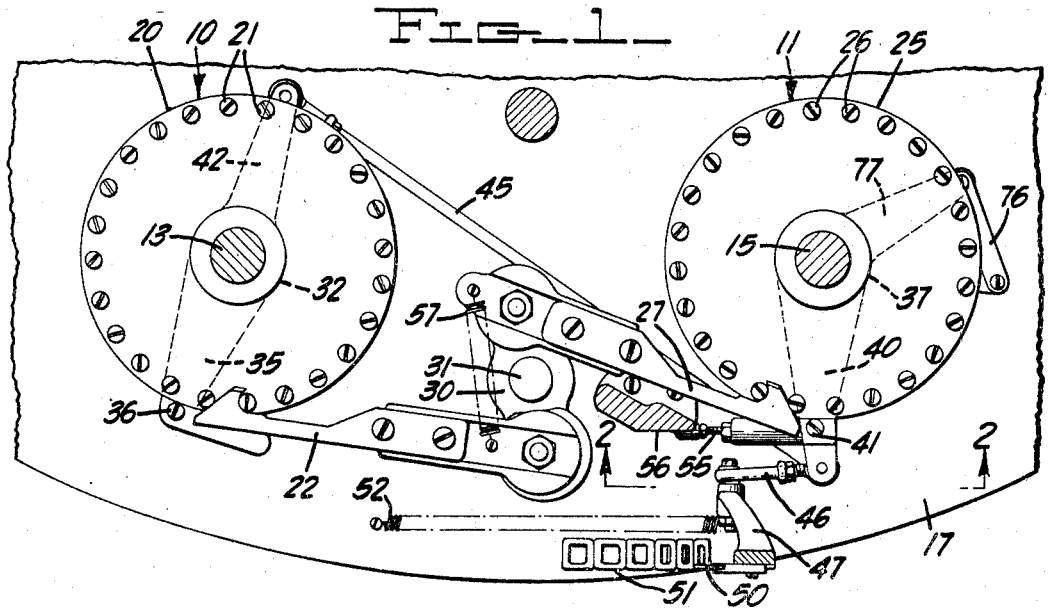
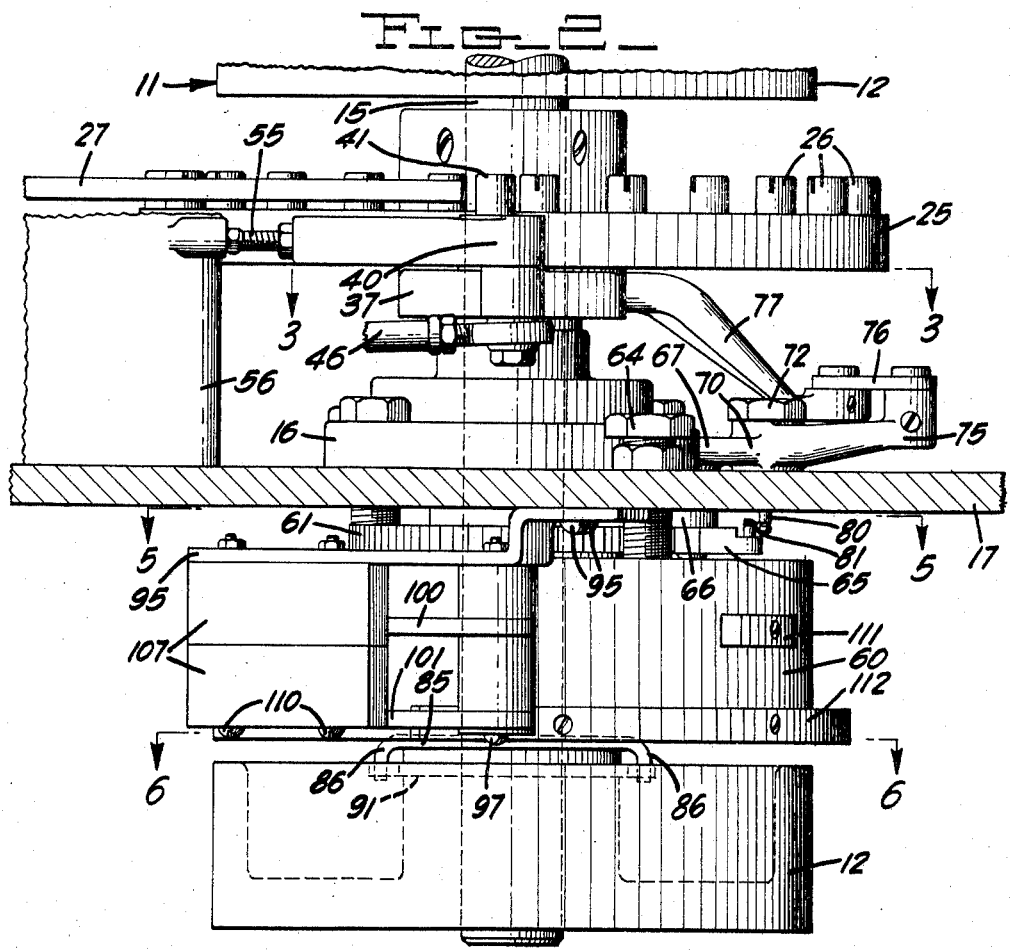

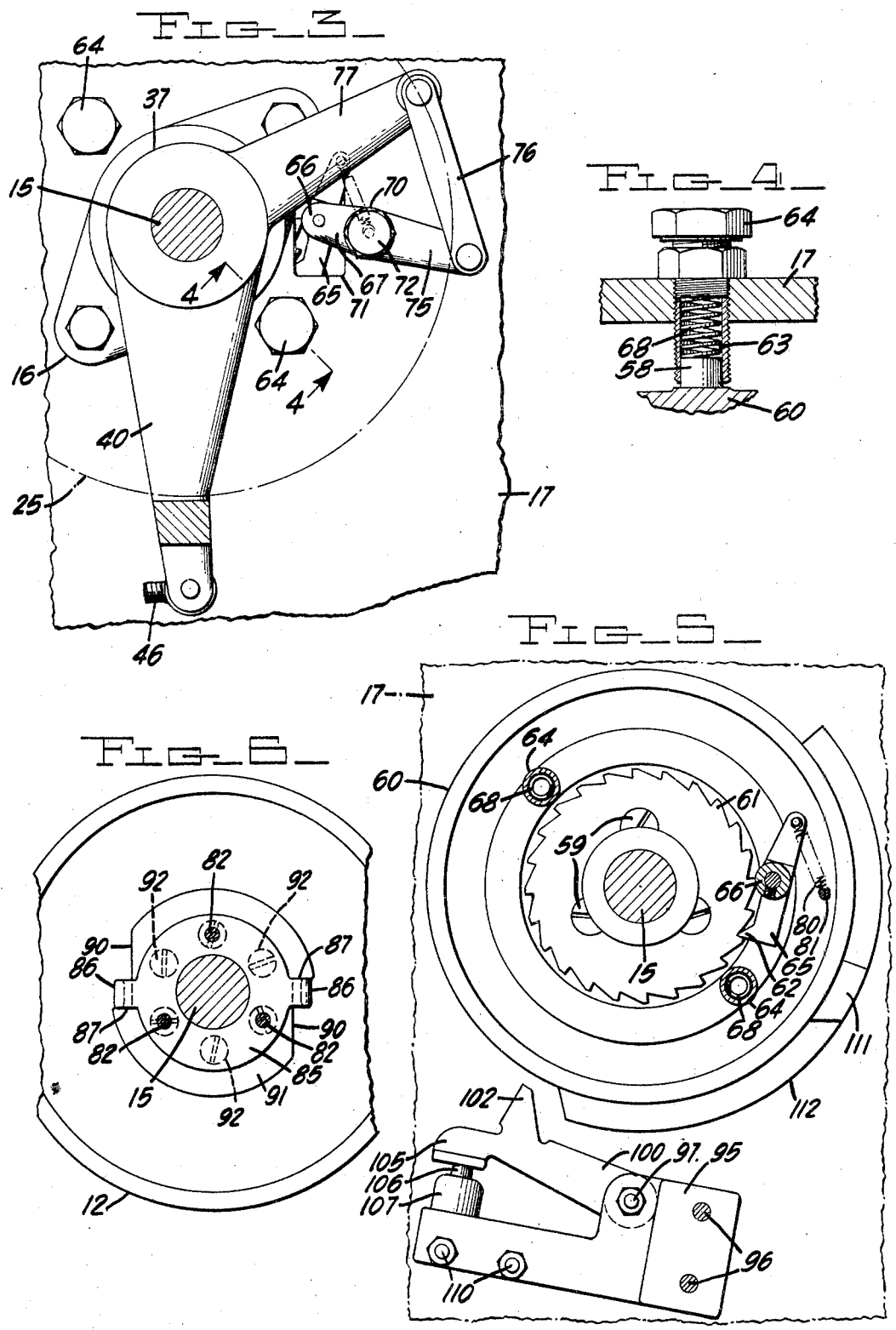

United States Patent Office 3,485,064
Patented Dec. 23, 1969

1

3,485,064
PATTERN MECHANISM FOR KNITTING MACHINES
Samuel F. Tobias, Jr., Laureldale, Pa., assignor, by mesne assignments, to North American Rockwell Corporation, Pittsburgh, Pa., a corporation of Delaware
Filed Dec. 15, 1967, Ser. No. 690,927
Int. Cl. D04b 15/74
U.S. Cl. 66—50                        7 Claims

ABSTRACT OF THE DISCLOSURE

Pattern mechanism for a circular knitting machine including a main pattern member, means for indexing the main pattern member, an auxiliary pattern member, and a first means for advancing the auxiliary pattern member independently of the main pattern member and a second means for advancing the auxiliary pattern member with the main pattern member during each indexing movement thereof.

BACKGROUND OF THE INVENTION

Field of the invention

The invention is directed to operating means for main and auxiliary cam drums of a circular knitting machine including indexing means for advancing the main cam drum in steps, means which is operated by the pattern chain of the machine for controlling the operation of the indexing means for the main cam drum, a first means which is operated by the controlling means for the main cam drum indexing means to advance the auxiliary cam drum independently of the main cam drum and a second means which is operated by the main cam drum during each indexing movement thereof to advance the auxiliary cam drum, the first and second advancing means acting to advance the auxiliary cam drum a distance equal to each indexing step of the main cam drum.

DESCRIPTION OF THE PRIOR ART

In circular knitting machine the various operating mechanisms of the machine are conventionally controlled by cam drums and the operation of the cam drums are in turn controlled by a pattern chain of the machine. In one conventional form of mechanism for operating the cam drums and pattern chain, disclosed in Patent No. 3,136,145, issued June 9, 1964, ratchet means on the cam drums are operated by pawls which are connected to and operated by a rock shaft. The rock shaft is oscillated in opposite directions by the quadrant gear of the machine or by means which provides the same oscillating movement as the quadrant gear. The chain is also operated by pawl and ratchet means connected to the rock shaft and the pawls for the cam drums and the pawl for the chain are operated to index the cam drum and chain in the same direction of oscillating movement of the rock shaft. Members associated with the pawls for the cam drums are normally positioned to inactivate the pawls and the members are moved to inactive position by the chain during one indexing movement thereof to permit the pawls to index the cam drums. When the operating mechanisms of the machine are to be activated by the cam drums, the members are moved to inactive positions

2 during one indexing movement of the chain to activate the pawls for the cam drums and these pawls then index the cam drums to activate the operating mechanism during the next indexing movement of the chain.

When the operating mechanisms require one indexing move of the cam drums to activate them and the operating mechanisms must be inactivated prior to the next indexing move of the cam drums, the drums are given an additional movement by auxiliary indexing means of the type disclosed in Patent No. 3,169,384, issued Feb. 16, 1965. The mechanism of said Patent No. 3,169,384 includes an auxiliary pawl which is operated from one quarter turn shaft of the machine to act on auxiliary ratchet teeth associated with the ratchet means on each of the cam drums. When an indexing movement of the cam drums by the main pawls to institute the operation of operating mechanisms of the machine also moves the auxiliary ratchet teeth into the path of the movement of the auxiliary pawls, the latter pawls then act on the auxiliary teeth to provide the additional movement to the cam drums.

At times activation of an operating mechanism by an indexing move of the cam drums must be preceded by an activation of another mechanism in the same cam drum indexing cycle, such for example as the activation of the machine speed slow-down means before the activation of the yarn change means to introduce a splicing yarn. In order to provide sufficient time for the speed slow-down means to function before the yarn change is made, the activation of the slow-down means must be initially instituted by chain operated switch means during the same indexing move thereof which institutes the cam drum indexing move. Thereafter, during the subsequent indexing move of the cam drums, the yarn change is made and a second switch is operated by one of the cam drums to continue the operation of the speed slow-down means.

Hence, while the devices of the above noted patents made it possible to control a machine operation by cam drum movements instituted by the main indexing means and to further control the same machine operation during a following indexing movement of the cam drums by auxiliary indexing means independently of the main indexing means, where a first machine operation was required immediately preceding a second machine operation instituted by the cam drum but within the same indexing cycle of the cam drums to institute the second machine operation, it was necessary to institute the first machine operation from the chain at the same time that the chain instituted the cam drum movement. The instant application is directed to an improvement to the mechanisms of said Patents Nos. 3,136,145 and 3,169,384 and other known similar operating means for the cam drums of a circular knitting machines, whereby machine functions may be instituted prior to an indexing movement of the cam drums to institute other functions of the machine.

SUMMARY OF THE INVENTION

Briefly summarized the invention resides in the provision of means for operating a main cam drum of a circular knitting machine including main indexing means for the cam drum, bluff means having an active position to inactivate the main indexing means and movable to inactive position by the pattern chain of the machine to permit the main indexing means to index the main cam drum, an auxiliary cam drum, and means for advancing the auxiliary cam drum through movements of the same extent as the indexing movements of the main cam drum. The latter means includes a first means which is operated by the movement of the bluff means from active to inactive positions to advance the auxiliary cam drum through a portion of each advancing movement and a second means which is operated by the indexing movement of the main cam drum to complete the advancing movement of the auxiliary cam drum.

BRIEF DESCRIPTION OF THE DRAWINGS

FIG. 1 is a plan view of indexing means for the pattern drums of a circular knitting machine of the type shown in said Patent No. 3,136,145 and having means according the instant invention incorporated therein;

FIG. 2 is a view on an enlarged scale taken on the line and in the direction of the arrows 2—2 of FIG. 1;

FIG. 3 is a view, with parts in section, taken along the line and in the direction of the arrows 3—3 of FIG. 2;

FIG. 4 is a cross-sectional view on an enlarged scale taken on the line and in the direction of the arrows 4—4 of FIG. 3;

FIG. 5 is a view, with parts in section, taken on the line and in the direction of the arrows 5—5 of FIG. 2; and FIG. 6 is a view with parts in section, taken on the line and in the direction of the arrows 6—6 of FIG. 2.

In the following description and in the drawings the invention is illustrated as incorporated in a knitting machine of the type disclosed in said Patent No. 3,136,145 to which reference may be made for detailed information as to the construction and operation thereof. However, the invention is not to be construed as limited to the machine of said patent as it may be employed to operate the pattern drums of other knitting machines in a similar manner and for the same purpose.

Referring to the drawings and more particularly to FIGS. 1 and 2 there is shown portions of a knitting machine, for knitting seamless stockings, said machine being of the type disclosed in said Patent No. 3,136,145 and including main cam drums indicated at 10 and 11, respectively, each having a plurality of superimposed cam drum sections 12 secured to vertically extending shafts 13 and 15, respectively, for rotation therewith. The shaft 15 is mounted for rotation in bearings, one of which is shown at 16 in FIGS. 2 and 3, secured to a bed plate 17 which is one of similar bed plates forming a part of the framework of the machine. The shaft 13 is mounted in a similar manner in bearings (not shown) on the bed plates.

The shaft 13 of the main cam drum 10 carries a ratchet wheel 20 having a peripherally mounted series of equally spaced pins 21 which are adapted to be acted on by a pawl 22. The shaft 15 of the main cam drum 11 also carries a ratchet wheel 25 having a peripherally mounted series of equally spaced pins 26 which are adapted to be acted on by a pawl 27. The pawls 22 and 27 are pivotally mounted on opposite ends of a double arm crank 30 fixed on a shaft 31. The shaft 31, which corresponds to the shaft 220 of said Patent No. 3,136,145, is oscillated at all times through a complete oscillation (forward and reverse stroke) such oscillations occuring at a frequency of one for every four rotations of the needle cylinder of the machine. The pawls are moved in the forward or clockwise portion of an oscillation of the shaft 31, as viewed in FIG. 1, to engage the pins on the associated ratchet wheels, when permitted to do so as hereinafter set forth, and the pawls are then moved in the reverse or counterclockwise portion of the same oscillation of the shaft to index each of the main cam drums a step equal to the spacing between the pins.

Pivotally mounted on the shaft 13 is an idler plate or lever 32 having one arm 35 the free end of which carries a pin 36 for engagement with the free end of the pawl 22. A similar idler plate or lever 37, pivotally mounted on the shaft 15, has one arm 40 which carries a pin 41 for engagement with the free end of the pawl 27. The free end of a second arm 42 of the lever 32 is pivotally connected by a link 45 to the free end of the arm 40 of the lever 37. The free end of the arm 40 is also pivotally connected by a second link 46 to a pivoted lever 47 adapted to be engaged and operated by riser portions 50 on the links of a pattern chain 51. A spring 52 connected between the lever 47 and the plate 17 normally biases the arms 35 and 40 of the levers 32 and 37, respectively, to active positions determined by engagement of a stop screw 55 on the arm 40 and a bracket 56 fixed on the plate 17 as shown in FIG. 1, and the arms are moved to inactive positions when a riser portion 50 on the chain 51 is moved into engagement with the lever 47. When the arms 35 and 40 are in active positions the pins thereon coact with the free ends of the pawls 22 and 27 to idle them during their forward and reverse strokes. On the other hand when the arms are moved to inactive positions by the chain, the pawls are moved into engagement with the pins on the associated ratchet wheels, by a spring 57 connected between the pawls, during forward strokes and the pawls then act to index the ratchet wheels and associated cam drums during their reverse strokes.

The chain 51 is indexed by a pawl not shown herein but which is similar to and which is operated to index the chain during the indexing movements of the pawls for the main cam drums in the manner disclosed in said Patent No. 3,136,145. Whenever an indexing movement of the main cam drums is required to institute machine functions the pawls 22 and 27 are activated during one indexing movement of the chain and the pawls 22 and 27 then index the cam drums during the next indexing movement of the chain. When the main cam drums are to be given an auxiliary movement immediately following an indexing movement by the pawls, such auxiliary movement may be obtained by the mechanism of said Patent No. 3,169,384 in the manner hereinbefore set forth.

In accordance with the instant invention means is also provided to institute an operation of the machine preliminary to another machine operation instituted by an indexing movement of the main cam drums. The means for this purpose, which is only shown in connection with the pattern drum assembly 11, includes an auxiliary cam drum 60 loosely mounted on the shaft 15 intermediate the lower main drum section 12 and the plate 17 for rotation relatively to, and for rotation with, the shaft and main cam drum, by the means and in the manner hereinafter set forth, under the control of an opposed pair of brake devices. Each of the brake devices includes a plug 58, of fiber or the like, mounted in a bore 63 formed in a stud 64 adjustably carried in the plate 17, the plug being biased into engagement with the upper surface of the auxiliary drum 60 by a spring 68 positioned between the plug and the end of the bore in the stud (FIGS. 3 and 4).

The auxiliary drum 60 is adapted to be advanced relatively to the main cam drum 11 by a first moving or advancing means including a toothed ratchet 61 which is fixed to the upper face of the auxiliary drum as by screws 59. The teeth of the ratchet 61, which are of the same number as the pins 26 in the ratchet wheel 25, are adapted to be engaged by a nose portion 62 of a pawl 65 pivotally mounted on the lower surface of a hub or boss 66 on one arm 67 of a lever 70. As shown in FIGS. 2 and 3 the boss 66 extends downwardly from the arm 67 through an opening 71 in the plate 17 and the lever 70 is pivotally mounted on a stud 72 on the upper surface of the plate. A second arm 75 of the lever 70 is pivotally connected by a link 76 to the free end of a second arm 77 of the lever 37.

The auxiliary cam drum 60 is adapted to be advanced with the main cam drum 11 by a second moving or advancing means including a plate 85 which is secured to the underside of the drum 60 by screws 82. The plate 85 is provided with opposed downwardly projecting ears 86 for engagement with end surfaces 87 of opposed notches 90 formed in a plate 91. The plate 91 is secured by screws 92 to the upper surface of the hub portion of the lower cam drum section 12, as shown in FIGS. 2 and 6.

A strap 95, secured to the underside of the plate 17 by screws 96, carries a stud 97 for pivotally mounting levers 100 and 101 (FIGS. 2 and 5). The levers 100 and 101, which are identical, each have a nose 102 for engagement with a circumferential row of cams on the auxiliary cam drum 60 and an end portion 105 adapted to act on an operating button 106 of a switch 107. The switches 107 are secured to the strap 95 by bolts 110, and one of the switches is connected into the operating circuit of the machine drive means for changing the drive means from high to slow operating speed and the other switch is connected into the operating circuit of the reinforcing yarn trimming mechanism of the machine.

During each movement of the levers 32 and 37 to inactive position by a riser portion 50 on the chain 51, as the chain is indexed, to institute an indexing movement of the main pattern drums 10 and 11 by the pawls 22 and 27, the lever 37 operates the pawl 65 to advance the auxiliary cam drum 60 relatively to the main cam drum 11 only through a distance equal to approximately one half of the distance between an adjacent pair of teeth of the ratchet 61. At this time the ears 86 on the plate 85 are moved out of engagement with the end surfaces 87 of the notches 90 in the plate 91 on the lower drum section 12. Thereafter during the subsequent indexing movement of the main cam drum 11 by the pawl 27 the end surfaces of the notches 90 re-engage the ears 86 on the plate 85 and move the auxiliary cam drum 60 with the main cam drum through the remainder of the distance between the adjacent pair of teeth of the ratchet 61. Hence, the auxiliary cam drum is advanced the same distance as the indexing movement of the main cam drums but in two separate steps with one of the steps occurring prior to the indexing movement and the other step occurring during the indexing movement of the main cam drums.

When the switches 107 are to be operated to institute their machine operations prior to machine operations instituted by the main cam drums 10 and 11, cams provided on the auxiliary cam drum 60 are moved beneath the levers 100 and 101, respectively, to operate the switches during movement of the auxiliary cam drum 60 by the pawl 65 as the lever 37 is moved to inactive position by a riser on the chain 51 to institute an indexing movement of the main cam drums by the pawls 22 and 27, respectively. The main cam drums are then indexed during the next indexing movement of the chain in the manner hereinbefore set forth. Where the machine functions instituted by the switches 107 are to remain in operation for only one indexing movement of the main cam drum only a short cam such as shown at 111 in FIGS. 2 and 5 is provided on the auxiliary cam drum 60. On the other hand where the machine functions instituted by the switches are to remain in operation for a plurality of indexing movements of the main cam drums long cams such as shown at 112 in FIGS. 2 and 5 are provided on the auxiliary cam drum 60.

It is believed to be obvious that while the auxiliary cam drum and operating means therefor is described in connection with only one of the main cam drums, similar means may be provided in association with both main cam drums where machine functions must be instituted in advance of other machine functions instituted by the main cam drums. Furthermore, while the auxiliary cam drum and its operation has been described in connection with main cam drums of the type disclosed in said Patent No. 3,136,145, the auxiliary cam drum may be employed in connection with any cam drum means which is controlled and operated in a similar manner.

It will be understood that the improvements specifically shown and described by which the above results are obtained can be changed and modified in various ways without departing from the invention herein disclosed and hereinafter claimed.

What I claim is:

1. In a circular knitting machine having a pattern chain adapted to be indexed in steps during operation of said machine, a main cam drum for controlling operating functions of the machine, a shaft on which said main cam drum is mounted, means for indexing said main cam drum, means for operating said indexing means for said main cam drum, idler means movable under the control of said pattern chain from an active position in which it inactivates said indexing means for said main cam drum to an inactive position in which it permits said indexing means to be operated by said operating means to index said main cam drum, the improvement including an auxiliary cam drum on said shaft for said main cam drum, first means for advancing said auxiliary cam drum, means for operating said first advancing means for said auxiliary cam drum, and second means operated by said main cam drum for advancing said auxiliary cam drum, said first advancing means operating to advance said auxiliary cam drum prior to the operation of said indexing means and said second advancing means operating to advance said auxiliary cam drum during operation of said indexing means to index said main cam drum.

2. A machine according to claim 1 in which said means for operating said first advancing means for said auxiliary cam drum includes said idler means, and there is means for connecting said idler means to said first advancing means, said connecting means being operated by said idler means during movement from said active position to said inactive position to operate said first advancing means to advance said auxiliary cam drum.

3. In a machine according to claim 2 in which said first advancing means for said auxiliary cam drum includes a ratchet on said auxiliary cam drum, and a pawl for operating said ratchet, and said pawl is connected to said idler means by said connecting means, said connecting means being operated by said idler means during movement from active to inactive position to operate said pawl to advance said auxiliary cam drum.

4. In a machine according to claim 1 in which said second advancing means for said auxiliary cam drum includes means connecting said main cam drum to said auxiliary cam drum, said connecting means being operated by said main cam drum during indexing movements thereof to operate said second advancing means to advance said auxiliary cam drum.

5. In a machine according to claim 4 in which said means connecting said main and auxiliary cam drums includes a first member on said auxiliary cam drum, a second member on said main cam drum, interengaging means on said first and second members, said interengaging means permitting advancing movements of said auxiliary cam drum by said first advancing means relative to said main cam drum and said interengaging means cooperating to advance said auxiliary cam drum with said main cam drum during indexing movements of said main cam drum.

6. In a machine according to claim 1 in which said main cam drum is operated in indexing movements by said indexing means through a complete rotative cycle, and there is means for advancing said auxiliary cam drum through a complete rotative cycle during each rotative cycle of said main cam drum including a first means for advancing said auxiliary cam drum, means for operating said first advancing means, a second means for advancing said auxiliary cam drum, said first and second advancing means operating to advance said auxiliary cam drum the same distance as said indexing movement of said main cam drum during each indexing movement of said main cam drum.

7. In a machine according to claim 6 in which said first advancing means for said auxiliary cam drum includes a ratchet on said auxiliary cam drum, and a pawl for operating said ratchet, and said means for operating said first advancing means includes said idler means.

References Cited

UNITED STATES PATENTS

| | | | |
|---|---|---|---|
| 1,056,589 | 3/1913 | Ryan | 66—154 XR |
| 2,196,073 | 4/1940 | Kent et al. | 66—154 |
| 2,764,006 | 9/1956 | Lawson et al. | 66—25 |
| 3,169,384 | 2/1965 | Coile | 66—154 XR |

FOREIGN PATENTS

| | | |
|---|---|---|
| 854,559 | 11/1952 | Germany. |
| 1,090,657 | 11/1967 | Great Britain. |

W. CARTER REYNOLDS, Primary Examiner

U.S. Cl. X.R.

66—154